US011245240B2

(12) United States Patent
Wiltraut et al.

(10) Patent No.: US 11,245,240 B2
(45) Date of Patent: Feb. 8, 2022

(54) CONTACT RETENTION PLATE FOR POWER CONNECTOR ASSEMBLY

(71) Applicant: TE Connectivity Services GmbH, Schaffhausen (CH)

(72) Inventors: David D. Wiltraut, Palmyra, PA (US); Edward T. Price, III, Mechanicsburg, PA (US)

(73) Assignee: TE Connectivity Services GmbH, Schaffhausen (CH)

( * ) Notice: Subject to any disclaimer, the term of this patent is extended or adjusted under 35 U.S.C. 154(b) by 72 days.

(21) Appl. No.: 16/733,823

(22) Filed: Jan. 3, 2020

(65) Prior Publication Data

US 2021/0210919 A1 Jul. 8, 2021

(51) Int. Cl.
*B23P 19/00* (2006.01)
*H01R 43/20* (2006.01)
*H01R 13/436* (2006.01)

(52) U.S. Cl.
CPC ......... *H01R 43/20* (2013.01); *H01R 13/4367* (2013.01); *Y10T 29/5327* (2015.01)

(58) Field of Classification Search
CPC ... H01R 13/40; H01R 43/20; Y10T 29/49826; Y10T 29/5193; Y10T 29/53235; Y10T 29/53261; Y10T 29/5327
USPC .... 29/761, 33 M, 564.2, 747, 748, 753, 755, 29/757, 876
See application file for complete search history.

(56) References Cited

U.S. PATENT DOCUMENTS 7,441,327 B2 * 10/2008 Furuya .................. H01R 43/20 29/747
10,574,017 B2 * 2/2020 Horiki .............. H01B 13/01209

* cited by examiner

*Primary Examiner* — Thiem D Phan

(57) ABSTRACT

A contact insertion machine includes a contact feeder having a feed finger configured to feed contacts of a power connector assembly in a feed direction along a feed track during a contact loading process. The contact insertion machine includes a power connector assembly holder holding a housing of the power connector assembly and movable relative to the feed track to position the housing to receive the contacts in a contact stack. The contact insertion machine includes a contact retention plate located upstream of the power connector assembly holder having a contact insertion port therethrough. The contact insertion port is aligned with the feed track downstream of the feed track. The power connector assembly holder is movable relative to the contact retention plate to position the housing to receive the contacts through the contact insertion port.

14 Claims, 13 Drawing Sheets

CONTACT RETENTION PLATE FOR POWER CONNECTOR ASSEMBLY

BACKGROUND OF THE INVENTION

The subject matter herein relates generally to power connector assemblies.

Power connector assemblies are used in many applications, such as automotive applications. For example, power connector assemblies may be used in electric vehicles or hybrid electric vehicles, such as battery connectors, charging connectors, and the like. Some known power connector assemblies include stacked contacts arranged within a housing. The stacked contacts are independently movable for mating with mating power contacts. The stacked contacts are loosely held in the housing for independent movement. Assembly of such power connector assemblies are difficult because the housing does not include holding features to hold the contacts. For example, the contacts are susceptible to falling out of the housing prior to final closing of the housing with a cover. Moreover, some known power connectors have design requirements that restrict touching of the mating surfaces of the contacts during the assembly process so as to not compromise the electrical performance of the power connector assemblies.

A need remains for a contact insertion machine and method for power connector assemblies.

BRIEF DESCRIPTION OF THE INVENTION

In one embodiment, a contact insertion machine is provided including a contact feeder having a feed finger configured to feed contacts of a power connector assembly in a feed direction along a feed track during a contact loading process. The contact insertion machine includes a power connector assembly holder configured to hold a housing of the power connector assembly and being movable relative to the feed track to position the housing to receive the contacts in a contact stack. The contact insertion machine includes a contact retention plate located upstream of the power connector assembly holder. The contact retention plate has a contact insertion port therethrough. The contact insertion port is aligned with the feed track downstream of the feed track. The power connector assembly holder is movable relative to the contact retention plate to position the housing to receive the contacts through the contact insertion port.

In another embodiment, a method of manufacturing a power connector assembly is provided. The method includes positioning a housing of the power connector assembly immediately forward of a contact retention plate using a power connector assembly holder such that a cavity of the housing faces the contact retention plate and positioning the power connector assembly in a first insertion position relative to the contact retention plate such that a contact insertion port of the contact retention plate is aligned with a first contact chamber of the housing. The method includes loading a first contact of a plurality of contacts through the contact insertion port of the contact retention plate into the first contact chamber at the first insertion position using a contact feeder. The method includes repositioning the power connector assembly to a second insertion position relative to the contact retention plate such that the contact insertion port of the contact retention plate is aligned with the first contact chamber of the housing at a location above the first contact, wherein the contact retention plate blocks the first contact from removal from the first contact chamber when the power connector assembly is positioned in the second insertion position. The method includes loading a second contact of the plurality of contacts through the contact insertion port of the contact retention plate into the first contact chamber at the second insertion position using the contact feeder such that the second contact is stacked above the first contact.

In an embodiment, a contact insertion machine is provided for loading contacts of a power connector assembly into a housing of the power connector assembly. The contact insertion machine includes a contact retention plate having a contact insertion port configured to receive the contacts therethrough and a power connector assembly holder positioned downstream of the contact retention plate aligned with the contact insertion port. The power connector assembly holder is configured to hold the housing of the power connector assembly to receive the contacts loaded through the contact insertion port. The power connector assembly is movable relative to the contact retention plate to position the housing relative to the contact insertion port to receive the contacts through the contact insertion port in a contact stack. The power connector assembly holder is movable in a vertical locating direction perpendicular to a feed direction of the contacts through the contact insertion port to position the housing to receive the contacts in the contact stack.

DETAILED DESCRIPTION OF THE INVENTION

Figure 1:
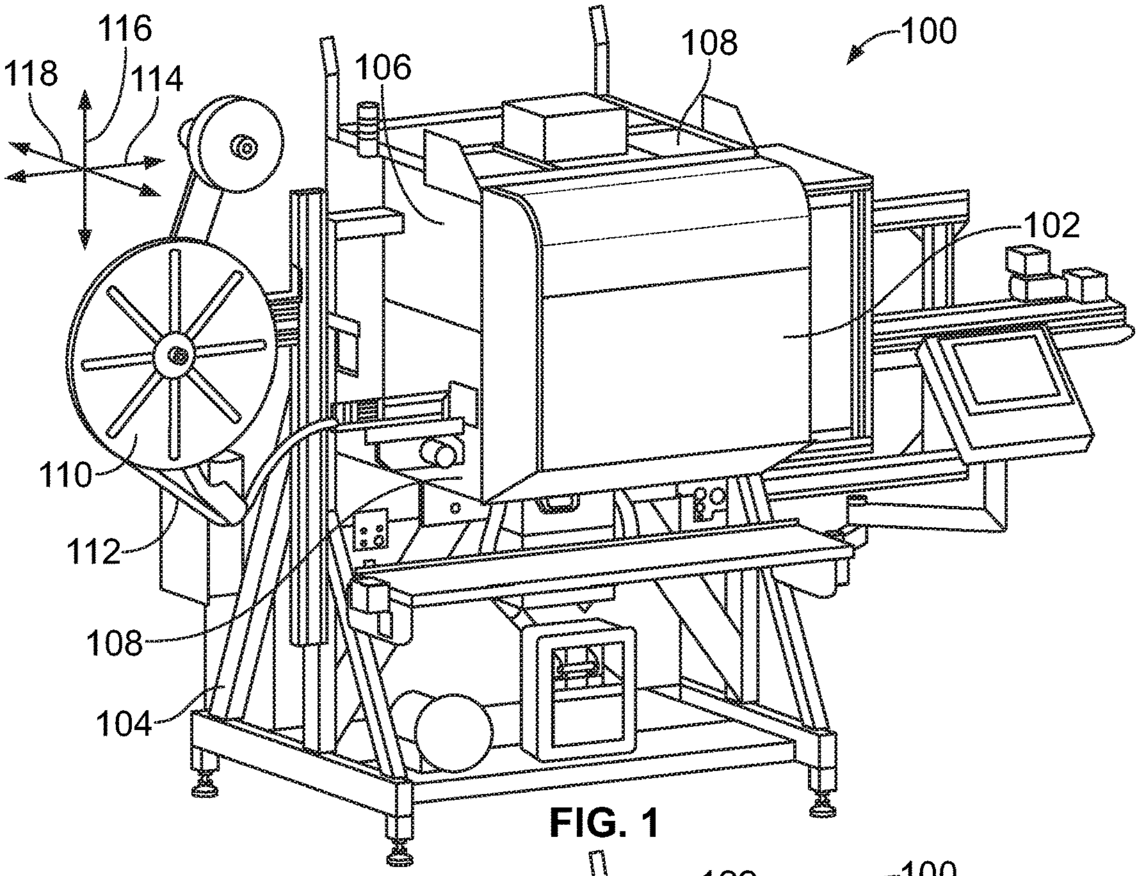
FIG. 1 is a front perspective view of a contact insertion machine in accordance with an exemplary embodiment for manufacturing a power connector assembly.
Figure 2:
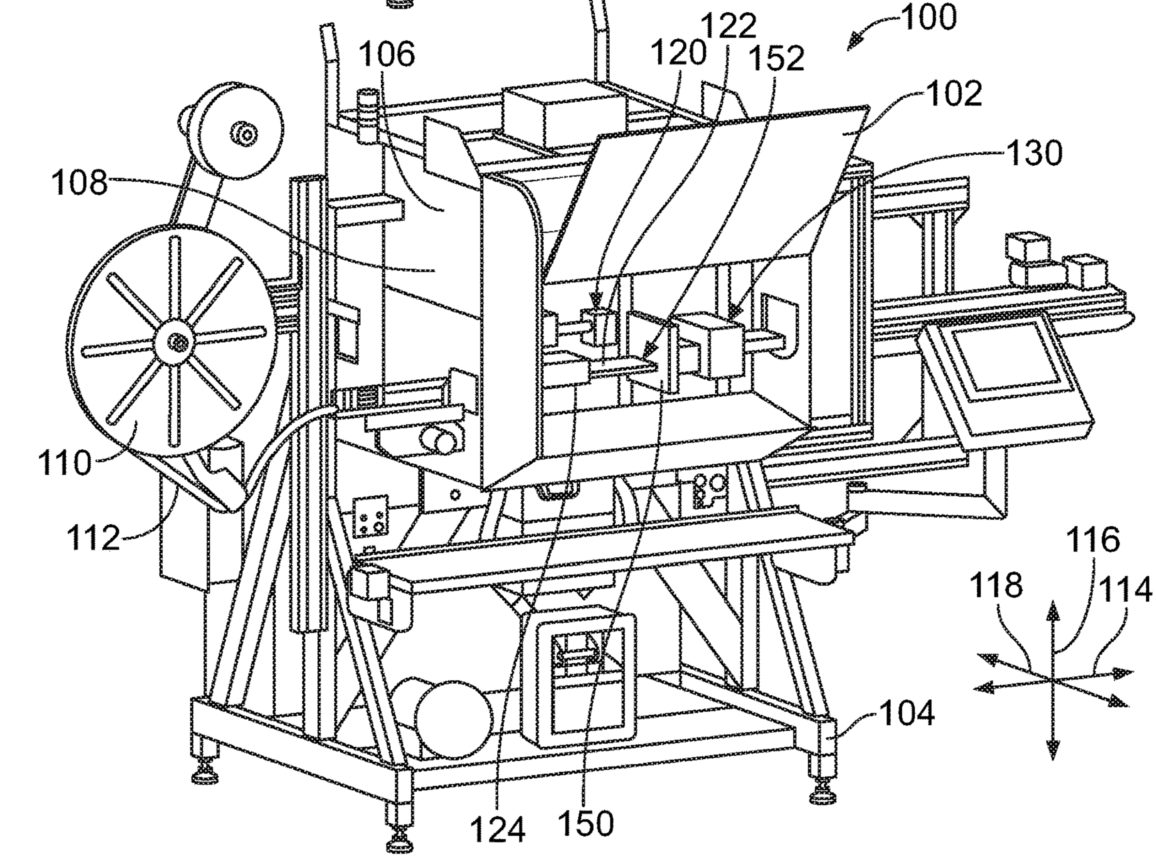
FIG. 2 is a front perspective view of the contact insertion machine in accordance with an exemplary embodiment.
Figure 3:
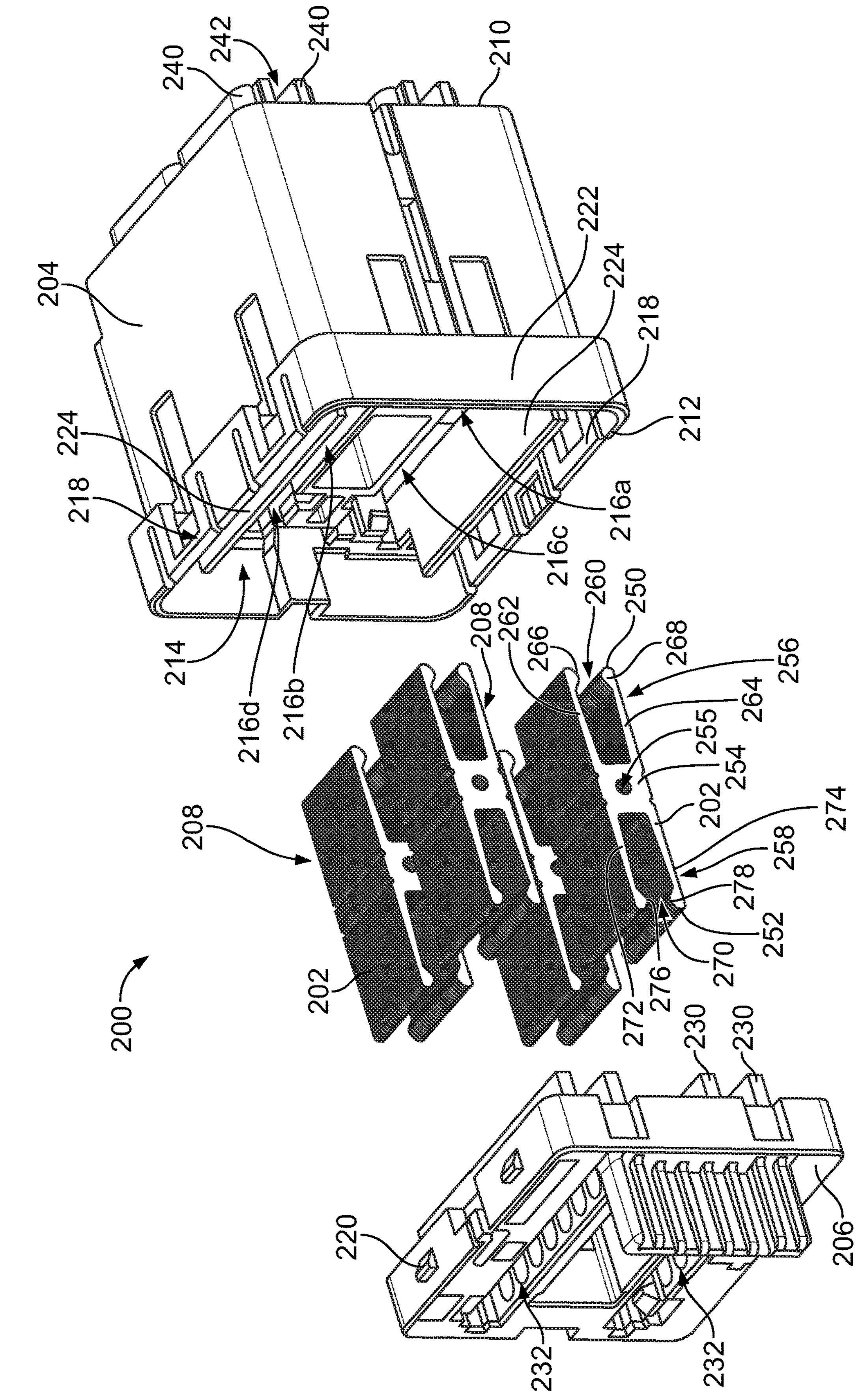
FIG. 3 is an exploded view of the power connector assembly in accordance with an exemplary embodiment.

FIG. 1 is a front perspective view of a contact insertion machine 100 in accordance with an exemplary embodiment for manufacturing a power connector assembly 200 (shown in FIG. 3). FIG. 2 is a front perspective view of the contact insertion machine 100 with a cover 102 of the contact insertion machine 100 open to illustrate components of the contact insertion machine 100.

The contact insertion machine 100 includes a frame 104 supporting the components of the contact insertion machine 100. The contact insertion machine 100 includes a cabinet 106 having walls 108 enclosing the cabinet 106. The cover 102 provides access to the cabinet 106. The frame 104 supports the cabinet 106. In an exemplary embodiment, the contact insertion machine 100 includes a reel 110 holding a strip 112 of contacts 202 (shown in FIG. 3) used in the power connector assembly 200. The contact insertion machine 100 is operated to insert the contacts 202 into a housing 204 (shown in FIG. 3) of the power connector assembly 200.

The contact insertion machine 100 includes a contact feeder 120 (FIG. 2) having a feed finger 122 configured to feed the contacts 202 in a feed direction along a feed track 124 during a contact loading process. The feed finger 122 may be electrically actuated, hydraulically actuated, pneumatically actuated, and the like. The feed finger 122 is configured to engage the strip 112 of contacts 202 to advance the contacts 202 in the feed direction. In an exemplary embodiment, the strip 112 includes a series of the contacts 202 arranged end to end that are successively fed along the feed track 124. The feed track 124 guides the contacts 202 from the reel 110 to the housing 204. The feed track 124 supports the strip 112 of contacts 202 from below. The feed track 124 may guide a vertical position and a horizontal position of the contacts 202 through the contact insertion machine 100. For example, the feed track 124 may include rails arranged on opposite sides of the strip 112 of contacts 202 to guide the strip 112 of the contacts 202 through the contact insertion machine 100.

The contact insertion machine 100 includes a power connector assembly holder 130 used to hold the housing 204 of the power connector assembly 200. The power connector assembly holder 130 may include a boxer sleeve that receives the housing 204. In other various embodiments, the power connector assembly holder 130 includes a gripper, a clip, or another type of fastener to securely hold the housing 204. The power connector assembly holder 130 positions the housing 204 to receive the contacts 202. For example, the power connector assembly holder 130 is generally aligned with the feed track 124 such that the contact feeder 120 is used to insert the contacts 202 into the housing 204.

In an exemplary embodiment, the power connector assembly holder 130 is movable relative to the feed track 124 to position the housing 204 to receive the contacts 202 in the housing 204. For example, during the contact loading process, the housing 204 is moved to load the contacts 202 in a contact stack. In an exemplary embodiment, the housing 204 is moved to load the contacts 202 in a plurality of contacts stacks, such as in different quadrants of the housing 204. In an exemplary embodiment, the power connector assembly holder 130 moves the housing 204 in a vertical locating direction perpendicular to the feed direction and in a horizontal locating direction or lateral locating direction perpendicular to the feed direction and the vertical locating direction. For example, the feed direction may be along a feed axis 114 and the power connector assembly holder 130 is configured to move the housing 204 along a vertical axis 116 and along a lateral axis 118. The axes 114, 116, 118 are mutually perpendicular axes.

In an exemplary embodiment, the power connector assembly holder 130 is electrically actuated by one or more stepper motors or servomotors. For example, the power connector assembly holder 130 may be slidable on guide rails in the vertical direction and/or the horizontal direction and/or the feed direction. In other various embodiments, the power connector assembly holder 130 may be hydraulically actuated or pneumatically actuated. In other various embodiments, the power connector assembly holder 130 may be moved by a robot arm in the vertical direction and/or the horizontal direction and/or the feed direction.

In an exemplary embodiment, the contact insertion machine 100 includes a contact retention plate 150 used to retain the contacts 202 in the housing 204 during the contact loading process. The contact retention plate 150 is located upstream of the power connector assembly holder 130. The power connector assembly holder 130 holds the housing 204 adjacent the contact retention plate 150. The contact retention plate 150 is located downstream of the feed track 124. The feed track 124 feeds the contacts 202 through a contact insertion port 152 in the contact retention plate 150 directly into the housing 204. In an exemplary embodiment, the contact retention plate 150 is fixed relative to the feed track 124. The contacts 202 are advanced along the feed track 124 through the contact insertion port 152 into the housing 204. The power connector assembly holder 130 moves the housing 204 relative to the contact insertion port 152 to vary the contact loading position into the housing 204.

The contact retention plate 150 is a backstop to prevent the contacts 202 from being removed from the housing 204 during the contact loading process. The contact retention plate 150 blocks all contacts in all other contact loading positions from removal from the housing 204 other than the single contact loading position aligned with the contact insertion port 152 being actively loaded by the contact insertion machine 100. In an exemplary embodiment, the power connector assembly holder 130 is movable to a contact blocking position in which all of the contacts 202 are blocked from removal from the housing 204 by the contact retention plate 150. In the contact blocking position, the power connector assembly holder 130 moves the housing 204 to a position such that none of the contacts 202 are aligned with the contact insertion port 152. As such, none of the contacts 202 are removable through the contact insertion port 152, rather all of the contacts 202 are retained in the housing 204 by the contact retention plate 150.

After all of the contacts 202 are loaded into the housing 204, the power connector assembly holder 130 moves the housing 204 away from the contact retention plate 150 to a station in which a rear cover may be coupled to the housing 204 to permanent retain the contacts 202 in the housing 204. In an exemplary embodiment, the power connector assembly holder 130 transitions the housing 204 from the contact retention plate 150 by rotating the housing 204 away from the contact retention plate 150 in a removal direction such that gravity retains the contacts 202 and the housing 204 prior to coupling the rear cover to the housing 204. The housing 204 may be rotated between 0° and 90° as the housing 204 is moved away from the contact retention plate 150. As such, the contact 202 are not inadvertently removed from the housing 204 after the housing 204 is moved away from the contact retention plate 150 and prior to the rear cover being coupled to the housing 204.

Figure 4:
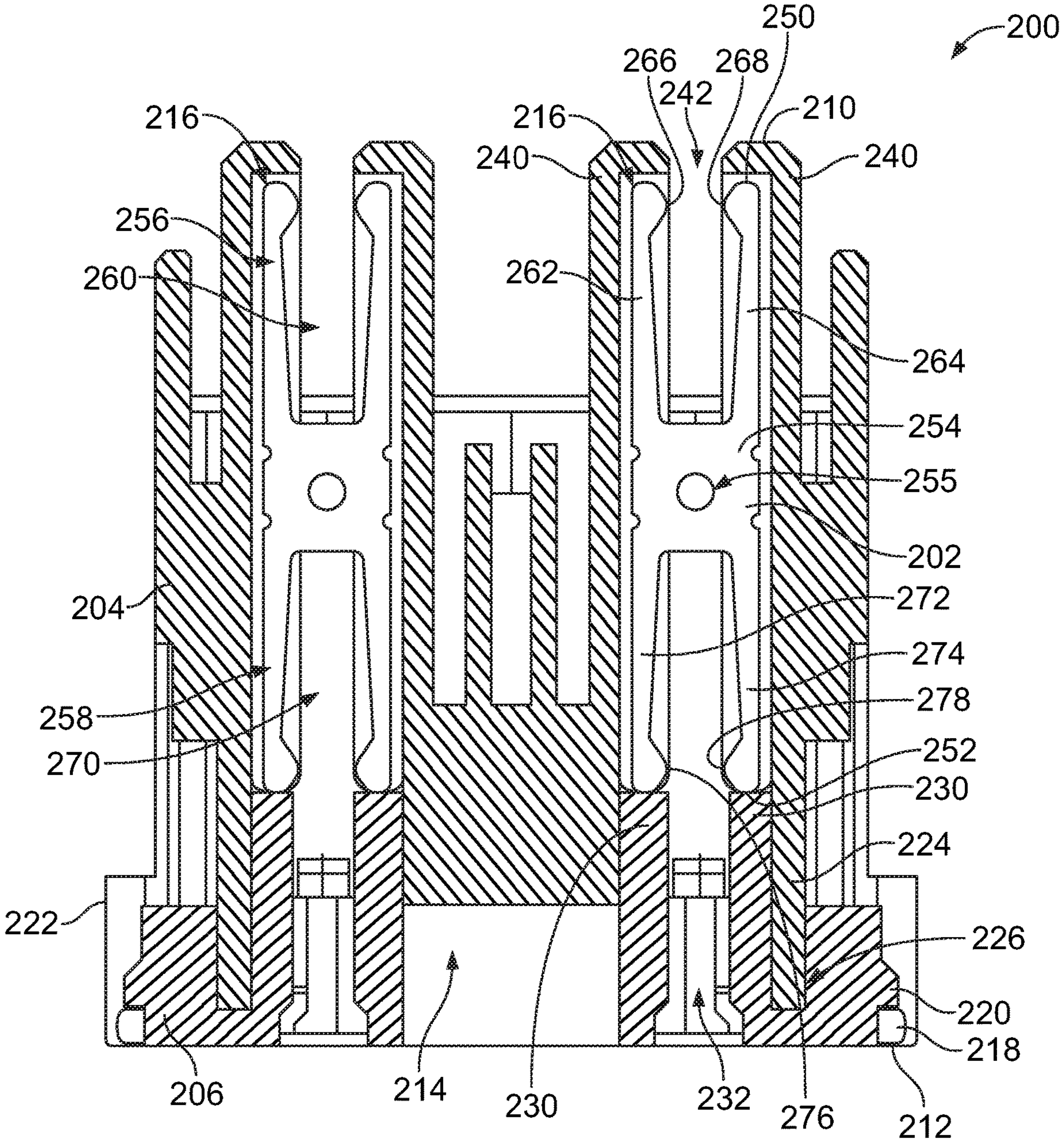
FIG. 4 is a cross-sectional view of the power connector assembly in accordance with an exemplary embodiment.
Figure 5:
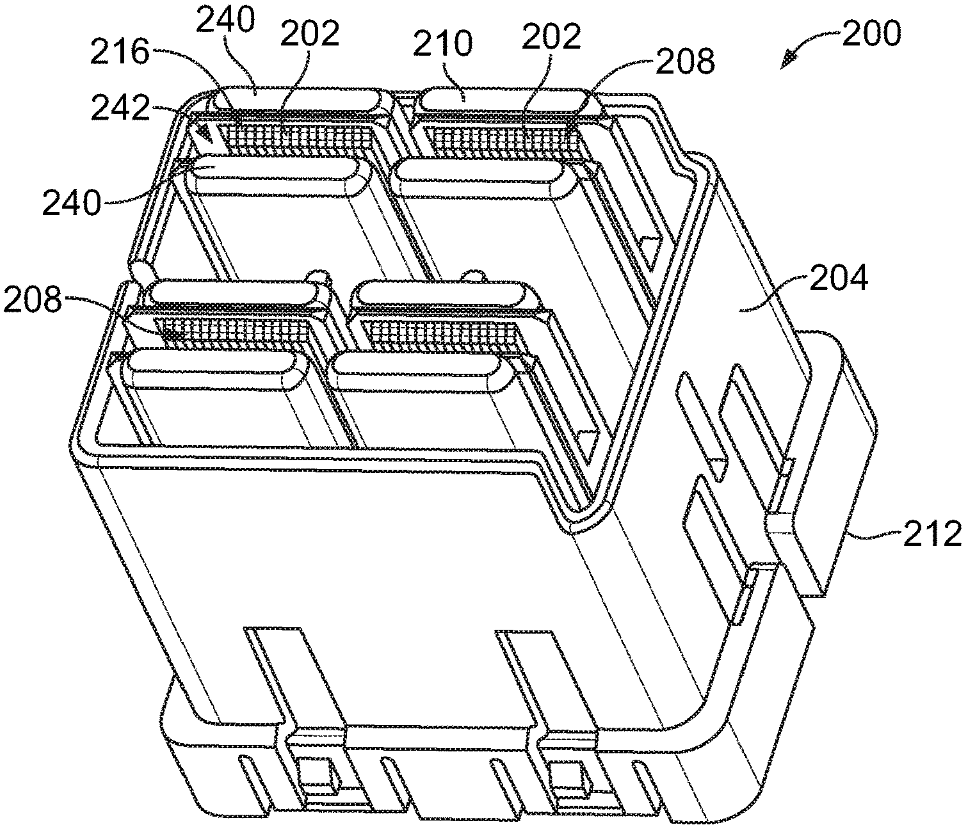
FIG. 5 is a front perspective view of the power connector assembly in accordance with an exemplary embodiment.
Figure 6:
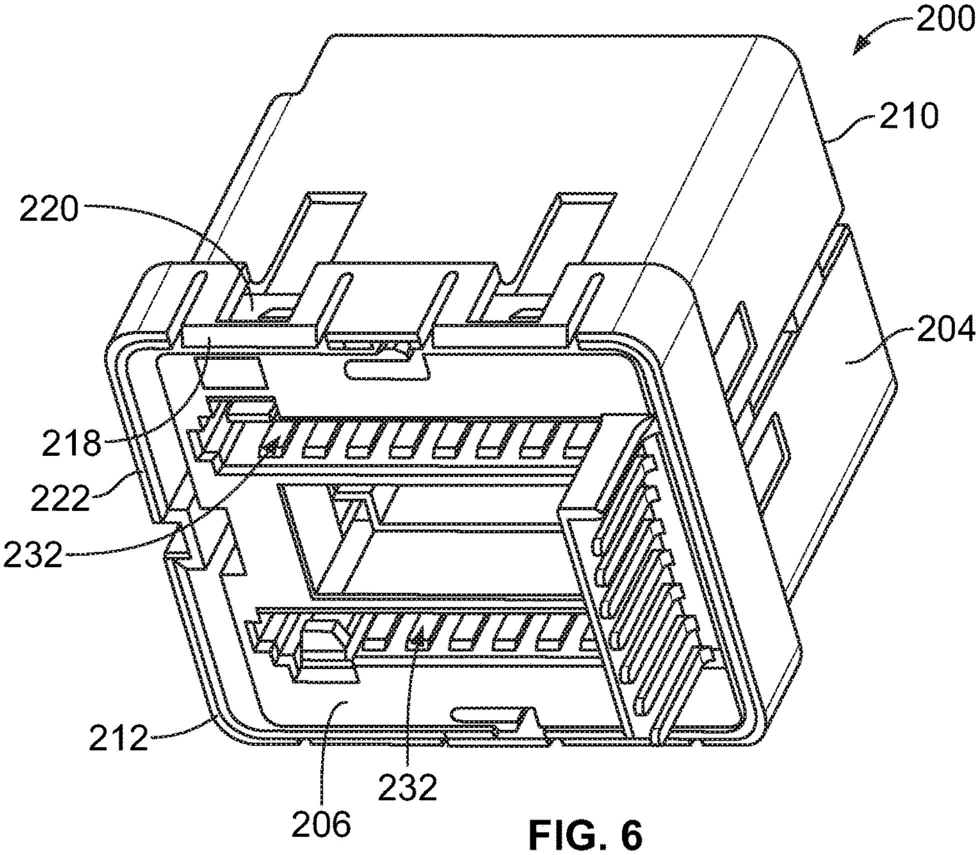
FIG. 6 is a rear perspective view of the power connector assembly in accordance with an exemplary embodiment.

FIG. 3 is an exploded view of the power connector assembly 200 in accordance with an exemplary embodiment. FIG. 4 is a cross-sectional view of the power connector assembly 200 in accordance with an exemplary embodiment. FIG. 5 is a front perspective view of the power connector assembly 200 in accordance with an exemplary embodiment. FIG. 6 is a rear perspective view of the power connector assembly 200 in accordance with an exemplary embodiment.

The power connector assembly 200 includes the housing 204 and a rear cover 206 configured to be coupled to the housing 204. The contacts 202 are configured to be inserted into the housing 204 and retained in the housing 204 by the rear cover 206 prior to assembly of the rear cover 206 to the housing 204, the contact retention plate 150 (shown in FIG. 2) is used to retain the contacts 202 in the housing 204 during the contact loading process.

In an exemplary embodiment, the contacts 202 are arranged in contact stacks 208. Each contact stack 208 includes a plurality of the contacts 202. In the illustrated embodiment, each contact stack 208 includes sixteen contacts 202; however, each contact stack 208 may include greater or fewer contacts 202 in alternative embodiments. The power connector assembly 200 includes a plurality of the contact stacks 208. For example, one or more of the contact stacks 208 may be positive contact stacks and one or more of the contact stacks 208 may be negative contact stacks. In the illustrated embodiment, four contact stacks 208 are provided. The contact stacks 208 are configured to be arranged in different quadrants of the housing 204. However, greater or fewer contact stacks 208 may be provided in alternative embodiments.

The housing 204 extends between a front 210 and a rear 212. The housing 204 has a cavity 214 at the rear 212. The cavity 214 is separated into a plurality of contact chambers 216 that receive corresponding contact stacks 208. For example, the housing 204 may include four contact chambers 216 (for example, a first or lower right contact chamber 216*a*, a second or upper right contact chamber 216*b*, a third or lower left contact chamber 216*c*, and a fourth or upper left contact chamber 216*d*). The cavity 214 is open at the rear 212 to receive the contacts 202 through the rear 212. The rear cover 206 is received in the cavity 214 at the rear 212 and coupled to the housing 204 at the rear 212. For example, the housing 204 may include latching features 218 and the rear cover 206 may include complementary latching features 220 configured interface with the latching features 218 to secure the rear cover 206 to the housing 204. When the rear cover 206 is coupled to the housing 204, the rear cover 206 retains the contacts 202 in the contact chambers 216.

In an exemplary embodiment, the housing 204 includes a rim 222 at the rear 212 surrounding the cavity 214. The rear cover 206 is coupled to the rim 222. The housing 204 includes rear guide plates 224 extending into the cavity 214. The rear guide plates 224 are received in guide slots 226 in the rear cover 206. The rear guide plates 224 position the rear cover 206 within the cavity 214.

In an exemplary embodiment, the rear cover 206 includes insertion fingers 230 extending from the front of the rear cover 206. The insertion fingers 230 are configured to be received in corresponding contact chambers 216 to engage the contacts 202. Once the insertion fingers 230 are mated with the corresponding contact chambers 216, the insertion fingers 230 retain the contacts 202 in the contact chambers 216. In an exemplary embodiment, the rear cover 206 includes rear blade slots 232 therethrough that receive power blades (not shown) configured to be coupled to the contacts 202. The rear blade slots 232 are defined between corresponding insertion fingers 230. The rear blade slots 232 are open at the rear of the rear cover 206 to receive the power blades.

In an exemplary embodiment, the housing 204 includes front support walls 240 at the front 210 that support the contact 202. The front support walls 240 define front portions of the contact chambers 216. In an exemplary embodiment, the housing 204 includes front blade slots 242 open at the front 210 to receive power blades (not shown) configured to be coupled to the contacts 202. The front blade slots 242 are defined between corresponding front support walls 240. The front blade slots 242 are open at the front 210 to receive the power blades.

In an exemplary embodiment, the contacts 202 are stamped contacts 202 configured to be arranged end to end within the strip 112 (shown in FIG. 2). Each contact 202 extends between a front 250 and a rear 252. The contact 202 includes a main body 254 approximately centered between the front 250 and the rear 252. Optionally, the main body 254 may include an opening 255. The opening may be engaged by the feed finger 122 (shown in FIG. 2) to advance the contact 202 along the feed track 124. The contact 202 includes a front mating end 256 at the front 250 and a rear mating end 258 at the rear 252.

The contact 202 includes a front mating slot 260 at the front mating end 256 between first and second front mating beams 262, 264. The mating beams 262, 264 include mating interfaces 266, 268, respectively. The mating beams 262, 264 are arranged on opposite sides of the front blade slot 242 to interface with the power blade. In an exemplary embodiment, the mating beams 262, 264 are deflectable. The mating beams 262, 264 extend along corresponding front support walls 240 within the contact chamber 216.

The contact 202 includes a rear mating slot 270 at the rear mating end 258 between first and second rear mating beams 272, 274. The mating beams 272, 274 include mating interfaces 276, 278, respectively. The mating beams 272, 274 are arranged on opposite sides of the rear blade slot 232 to interface with the power blade. In an exemplary embodiment, the mating beams 272, 274 are deflectable. The mating beams 272, 274 are engaged by the insertion fingers 230 of the rear cover 206 to retain the contacts 202 in the housing 204.

Figure 7:
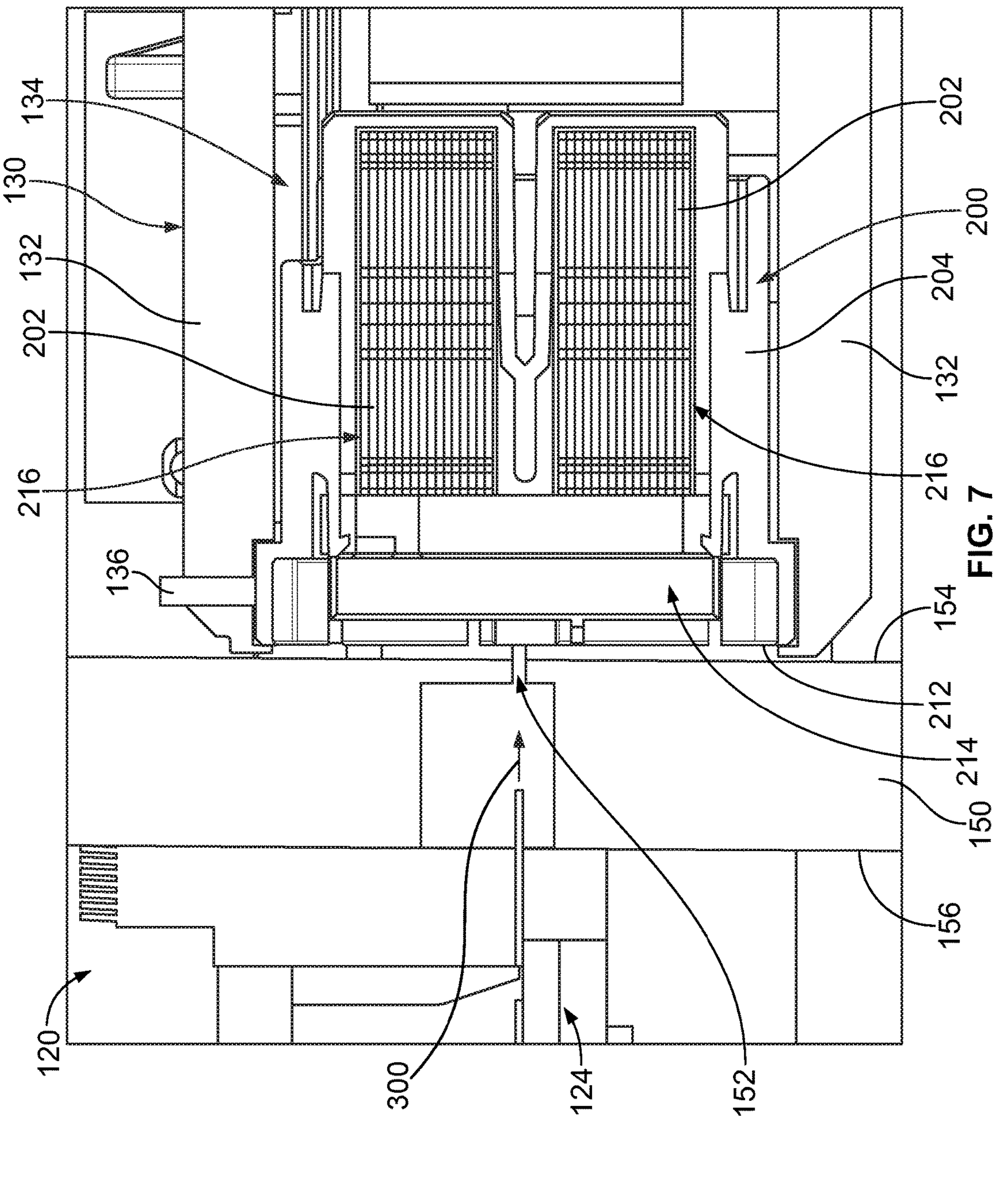
FIG. 7 is a cross-sectional view of a portion of the contact insertion machine showing a power connector assembly holder holding the power connector assembly relative to a contact retention plate.

FIG. 7 is a cross-sectional view of a portion of the contact insertion machine 100 showing the power connector assembly holder 130 holding the power connector assembly 200 relative to the contact retention plate 150. The power connector assembly holder 130 is shown in a contact blocking position relative to the contact retention plate 150 wherein all of the contacts 202 in the housing 204 are offset from the contact insertion port 152 such that none of the contacts 202 may be removed from the housing 204. The contact retention plate 150 is used to retain all of the contacts 202 in the housing 204 in the contact blocking position.

The power connector assembly holder 130 includes support walls 132 forming a cavity 134 that receives the housing 204. The housing 204 is retained within the cavity 134 by the support walls 132 and/or using a fastener 136, such as a spring loaded retention pin, a threaded fastener, and the like. The power connector assembly holder 130 is movable relative to the contact retention plate 150 to change the position of the housing 204 relative to the contact insertion port 152 of the contact retention plate 150. For example, different contact chambers 216 may be aligned with the contact insertion port 152 for loading the contacts 202 into such contact chamber 216 while other contact chambers 216 are offset from the contact insertion port 152, thus blocking removal of the contact 202 from such contact chambers 216 by the contact retention plate 150. The power connector assembly holder 130 is movable along the vertical axis 116 and/or the lateral axis 118 (shown in FIG. 2). In various embodiments, the power connector assembly holder 130 may be moved in steps (for example, downward along the vertical axis 116 by a distance approximately equal to a thickness of each contact 202) for stacking the contacts 202 on top of each other during the contact loading process.

The contact retention plate 150 extends between a front surface 154 and a rear surface 156. The rear surface 156 faces the contact feeder 120 and the feed track 124. The front surface 154 faces the power connector assembly holder 130 and the housing 204. For example, the cavity 214 at the rear 212 of the housing 204 is open and faces the front surface 154 of the contact retention plate 150 for loading the contacts 202 into the contact chambers 216 through the rear 212 of the housing 204. The power connector assembly holder 130 holds the housing 204 immediately forward of the contact retention plate 150. For example, the power connector assembly holder 130 and/or the housing 204 may abut against the front surface 154 in various embodiments. The feed track 124 extends to the rear surface 156 of the contact retention plate 150 and may abut against the rear surface 156 in various embodiments. The contact feeder 120 is advanced toward the contact retention plate 150 in a feed direction 300 to advance the contacts 202 through the contact insertion port 152 into the housing 204.

Figure 8:
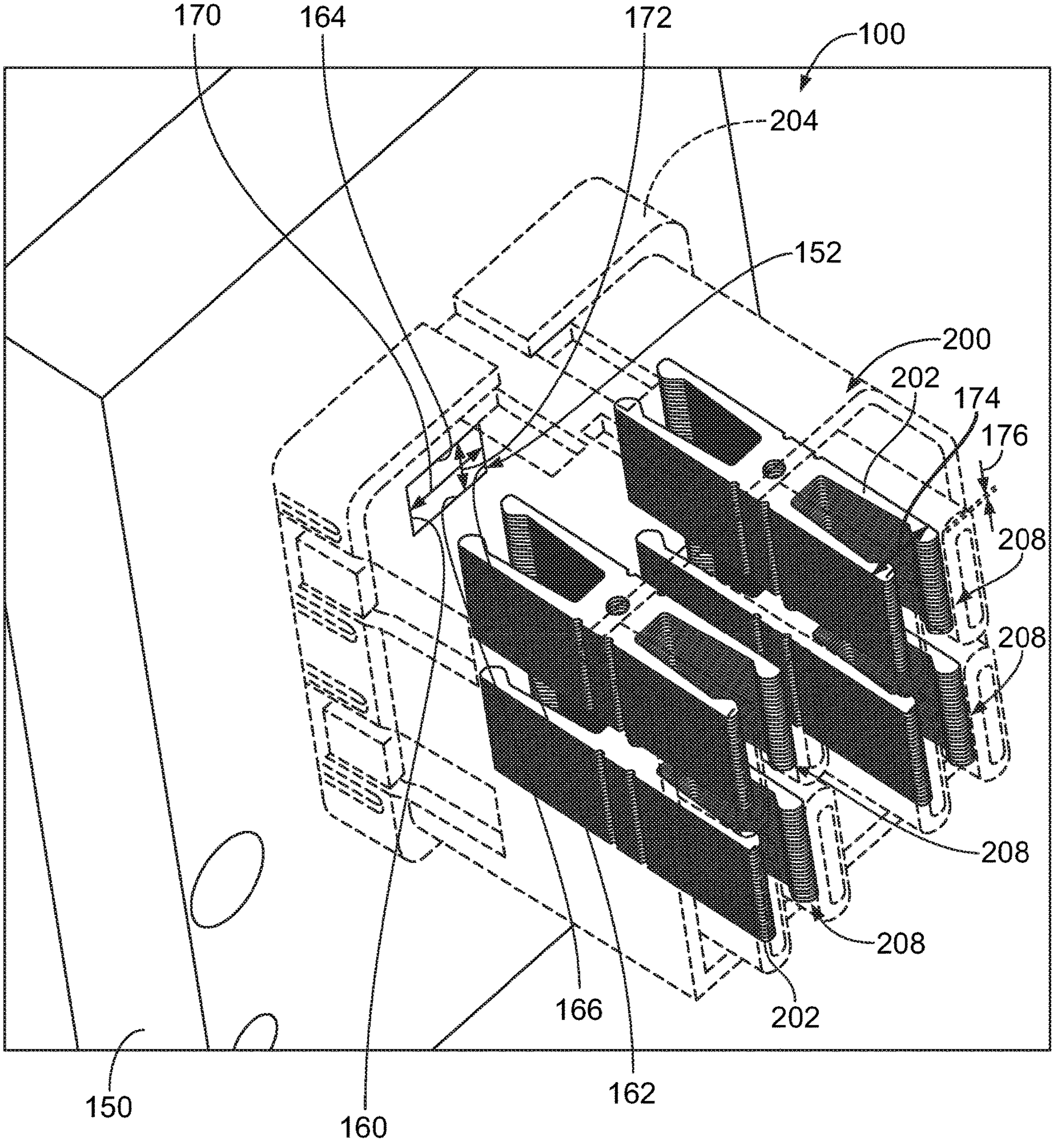
FIG. 8 is a partial sectional view of a portion of the contact insertion machine showing the contact retention plate in accordance with an exemplary embodiment.

FIG. 8 is a partial sectional view of a portion of the contact insertion machine 100 showing the contact retention plate 150 in accordance with an exemplary embodiment. The housing 204 of the power connector assembly 200 is shown in phantom in FIG. 8 to illustrate the contacts 202 positioned relative to the contact insertion port 152 in the contact retention plate 150. During the contact loading process, the contacts 202 pass through the contact insertion port 152 into the housing 204 to stack the contacts 202 in the contact stacks 208. The power connector assembly 200 is moved relative to the contact insertion port 152 for stacking the contact 202 in the various contact stacks 208. The contacts 202 offset from the contact insertion port 152 are retained in the housing 204 by the contact retention plate 150. The contact 202 or unable to fall out of the housing 204 during the contact loading process using the contact retention plate 150 as a backstop to retain the contacts 202 in the housing 204.

The contact insertion port 152 includes a first side edge 160 and a second side edge 162 opposite the first side edge 160. The contact insertion port 152 has a width 170 between the first and second side edges 160, 162 being slightly wider than a width 172 of the contacts 202, which allows the contacts 202 to pass freely through the contact insertion port 152 while maintaining a small contact insertion port size to retain the contacts 202 in the housing 204. The contact insertion port 152 includes an upper edge 164 and a lower edge 166 opposite the upper edge 164. The contact insertion port 152 has a height 174 between the upper and lower edges 164, 166 being slightly tolerant then a height 176 of the contacts 202, which allows the contacts 202 to pass freely through the contact insertion port 152 while maintaining a small contact insertion port size to retain the contacts 202 in the housing 204.

Figure 9:
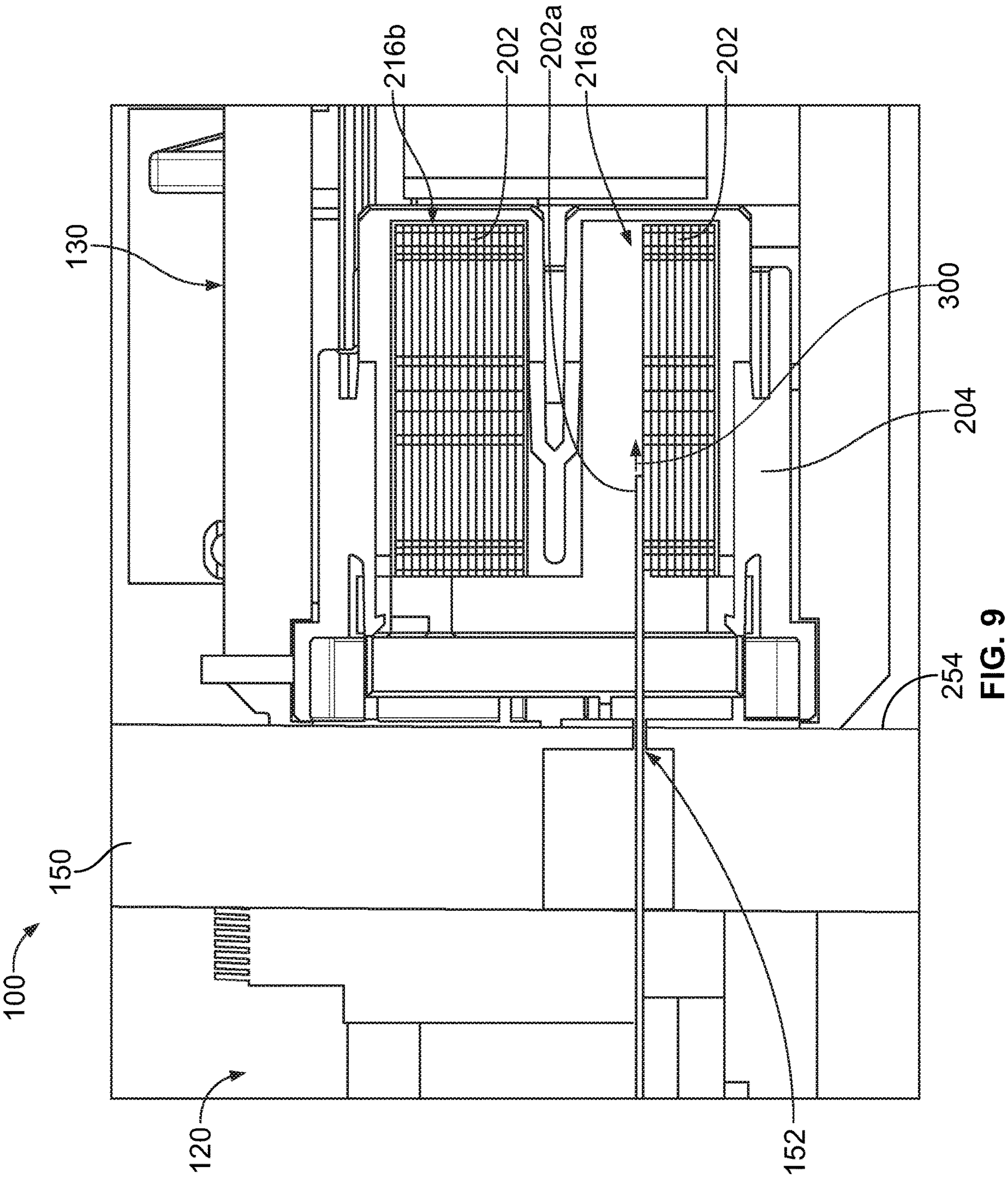
FIG. 9 is a cross-sectional view of a portion of the contact insertion machine showing a contact partially loaded into a housing of the power connector assembly during a contact loading process.

FIG. 9 is a cross-sectional view of a portion of the contact insertion machine 100 showing one of the contacts 202*a* being loaded into the housing 204 during the contact loading process. The power connector assembly holder 130 is shown in a first insertion position relative to the contact retention plate 150 wherein the first contact chamber 216*a* is aligned with the contact insertion port 152. The contact feeder 120 loads the corresponding contact 202*a* through the contact insertion port 152 of the contact retention plate 150 into the first contact chamber 216*a* in the feed direction 300. The contact insertion machine 100 forms the first contact stack 208*a* in the first contact chamber 216*a* by stacking the contacts 202. For example, the bottom contact 202 in the contact stack 208*a* is initially loaded into the contact chamber 216*a* and then the additional contacts 202 are successively stacked on top of each other to form the contact stack 208*a*.

In the first insertion position, the contact insertion port 152 of the contact retention plate 150 is aligned with a single contact position within the housing 204. The contact retention plate 150 blocks all other contacts 202 from removal from the housing 204. For example, other contacts 202 in the first contact chamber 216*a* are blocked by the front surface 154 of the contact retention plate 150 from removal from the housing 204. Additionally, the contacts 202 in the second contact chamber 216*b* (and third and fourth contact chambers 216*c*, 216*d* (shown in FIG. 3)) are blocked by the front surface 154 of the contact retention plate 150 from removal from the housing 204.

Figure 10:
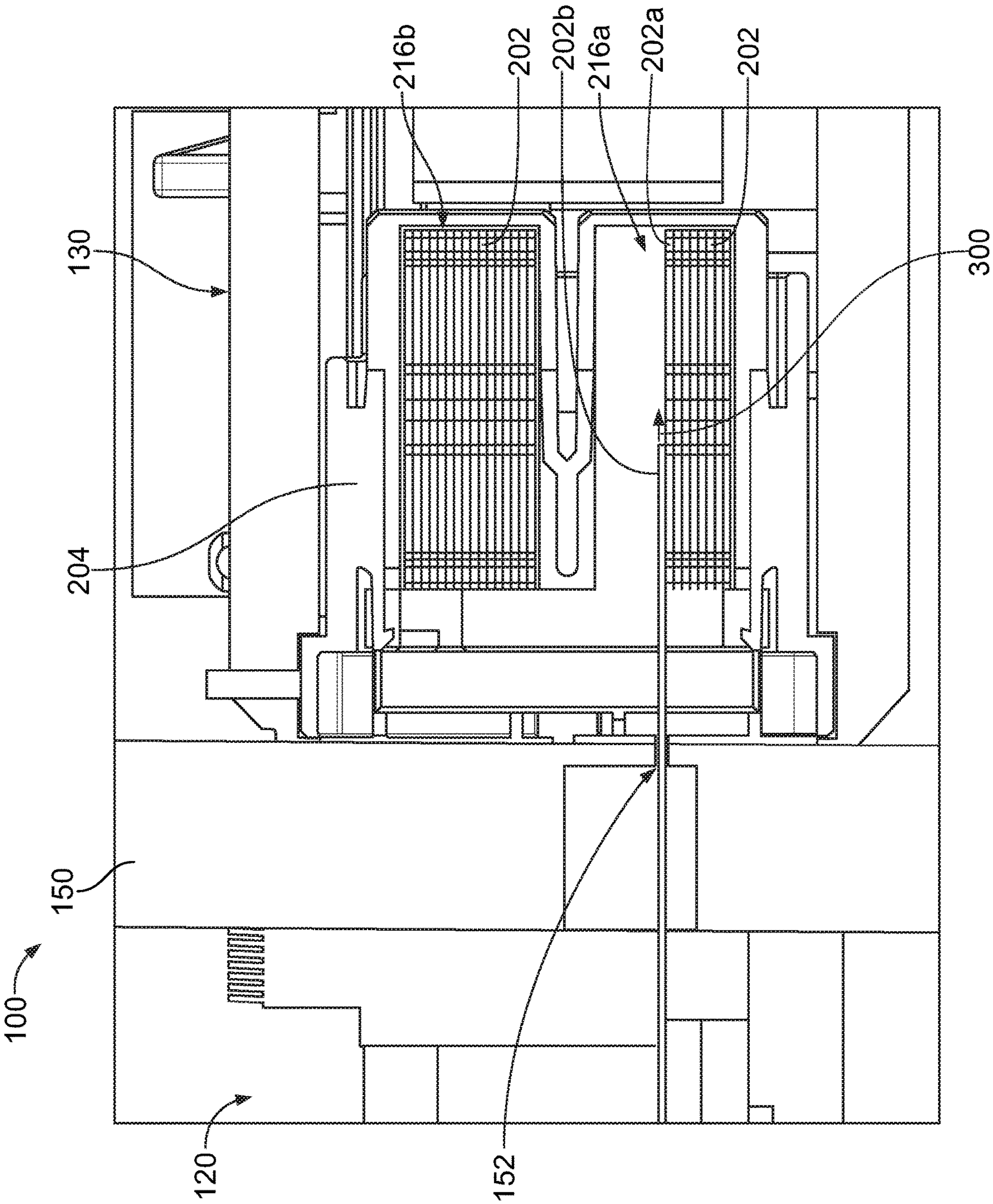
FIG. 10 is a cross-sectional view of a portion of the contact insertion machine showing a contact partially loaded into the housing of the power connector assembly during a contact loading process.

FIG. 10 is a cross-sectional view of a portion of the contact insertion machine 100 showing one of the contacts 202*b* being loaded into the housing 204 during the contact loading process. The power connector assembly holder 130 is shown in a second insertion position relative to the contact retention plate 150 wherein the first contact chamber 216*a* is aligned with the contact insertion port 152. The contact feeder 120 loads the corresponding contact 202*b* through the contact insertion port 152 of the contact retention plate 150 into the first contact chamber 216*a* in the feed direction 300. The contact insertion machine 100 forms the first contact stack 208*a* in the first contact chamber 216*a* by stacking the contacts 202. For example, the contact 202*b* loaded into the housing 204 in FIG. 10 is stacked on top of the contact 202*a* loaded into the housing 204 in FIG. 9. The power connector assembly holder 130 is shifted downward in the vertical locating direction along the vertical axis 116 from the position illustrated in FIG. 9 to the position illustrated in FIG. 10 to load the contact 202*b* on top of the contact 202*a*.

Figure 11:
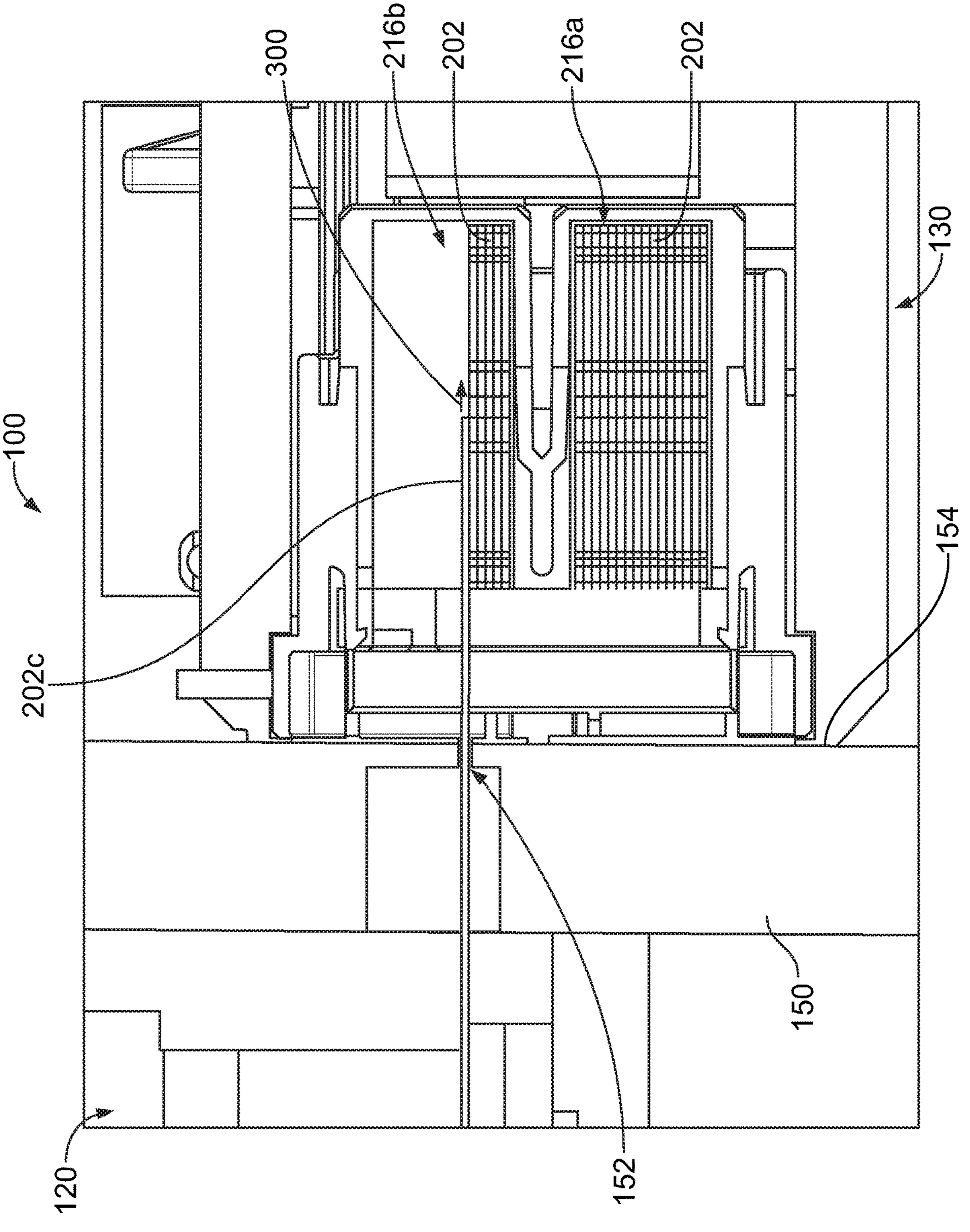
FIG. 11 is a cross-sectional view of a portion of the contact insertion machine showing a contact partially loaded into the housing of the power connector assembly during a contact loading process.

FIG. 11 is a cross-sectional view of a portion of the contact insertion machine 100 showing one of the contacts 202*c* being loaded into the housing 204 during the contact loading process. The power connector assembly holder 130 is shown in a third insertion position relative to the contact retention plate 150 wherein the second contact chamber 216*b* is aligned with the contact insertion port 152. The contact feeder 120 loads the corresponding contact 202*c* through the contact insertion port 152 of the contact retention plate 150 into the second contact chamber 216*b* in the feed direction 300. The contact insertion machine 100 forms the second contact stack 208*b* in the second contact chamber 216*b* by stacking the contacts 202. For example, the bottom contact 202 in the contact stack 208*b* is initially loaded into the contact chamber 216*b* and then the additional contacts 202 are successively stacked on top of each other to form the contact stack 208*b*.

In the third insertion position, the contact insertion port 152 of the contact retention plate 150 is aligned with a single contact position within the housing 204. The contact retention plate 150 blocks all other contacts 202 from removal from the housing 204. For example, other contacts 202 in the second contact chamber 216*b* are blocked by the front surface 154 of the contact retention plate 150 from removal from the housing 204. Additionally, the contacts 202 in the first contact chamber 216*a* (and third and fourth contact chambers 216*c*, 216*d* (shown in FIG. 3)) are blocked by the front surface 154 of the contact retention plate 150 from removal from the housing 204.

Figure 12:
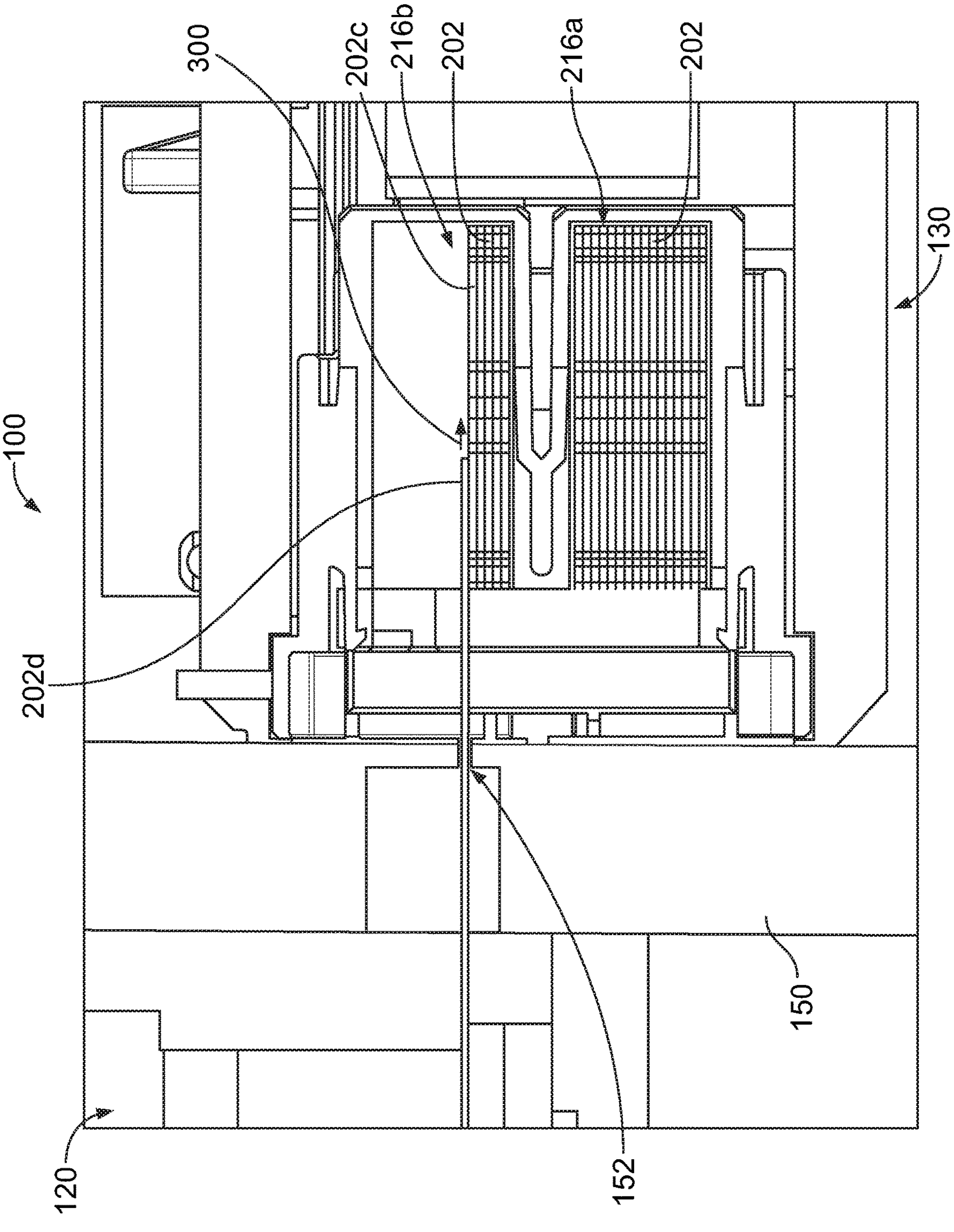
FIG. 12 is a cross-sectional view of a portion of the contact insertion machine showing a contact partially loaded into the housing of the power connector assembly during a contact loading process.

FIG. 12 is a cross-sectional view of a portion of the contact insertion machine 100 showing one of the contacts 202*d* being loaded into the housing 204 during the contact loading process. The power connector assembly holder 130 is shown in a fourth insertion position relative to the contact retention plate 150 wherein the second contact chamber 216*b* is aligned with the contact insertion port 152. The contact feeder 120 loads the corresponding contact 202*d* through the contact insertion port 152 of the contact retention plate 150 into the second contact chamber 216*b* in the feed direction 300. The contact insertion machine 100 forms the second contact stack 208*b* in the second contact chamber 216*b* by stacking the contacts 202. For example, the contact 202*d* loaded into the housing 204 in FIG. 12 is stacked on top of the contact 202*c* loaded into the housing 204 in FIG. 11. The power connector assembly holder 130 is shifted downward in the vertical locating direction along the vertical axis 116 from the position illustrated in FIG. 11 to the position illustrated in FIG. 12 to load the contact 202*d* on top of the contact 202*c*.

Figure 13:
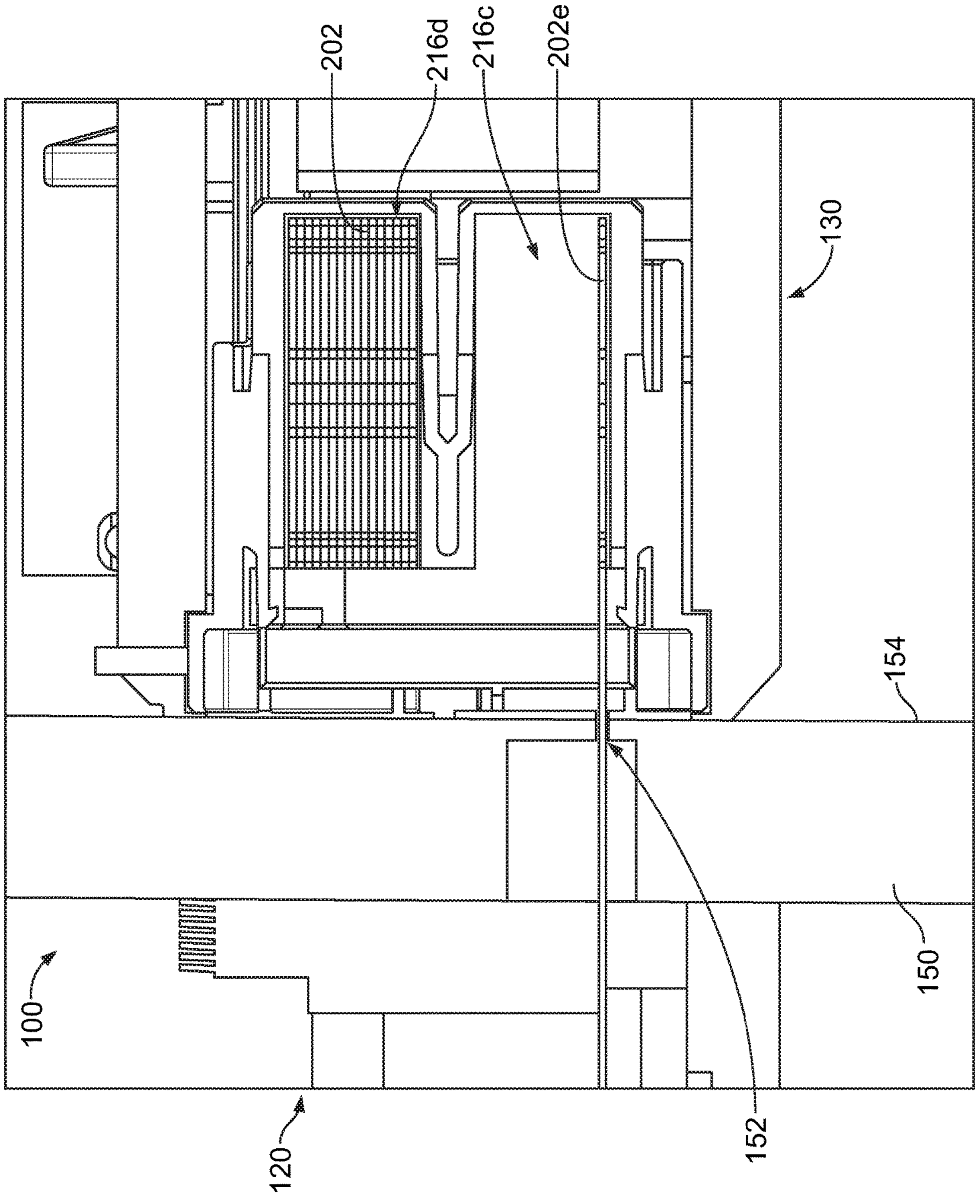
FIG. 13 is a cross-sectional view of a portion of the contact insertion machine showing a contact partially loaded into the housing of the power connector assembly during a contact loading process.

FIG. 13 is a cross-sectional view of a portion of the contact insertion machine 100 showing one of the contacts 202*e* being loaded into the housing 204 during the contact loading process. The power connector assembly holder 130 is shown in a fifth insertion position relative to the contact retention plate 150 wherein the third contact chamber 216*c* is aligned with the contact insertion port 152. The contact feeder 120 loads the corresponding contact 202*e* through the contact insertion port 152 of the contact retention plate 150 into the third contact chamber 216*c*. The contact insertion machine 100 forms the third contact stack 208*c* in the third contact chamber 216*c* by stacking the contacts 202. In the illustrated embodiment, the contact 202*e* is the bottom contact 202 in the contact stack 208*c* initially loaded into the contact chamber 216*c*. Other contacts 202 are configured to be successively stacked on top of the contact 202*e* to form the contact stack 208*c*.

In the third insertion position, the contact insertion port 152 of the contact retention plate 150 is aligned with a single contact position within the housing 204. The contact retention plate 150 blocks all other contacts 202 from removal from the housing 204. For example, the contacts 202 in the fourth contact chamber 216*d* (and the first and second contact chambers 216*a*, 216*b* (shown in FIG. 3)) are blocked by the front surface 154 of the contact retention plate 150 from removal from the housing 204.

Figure 14:
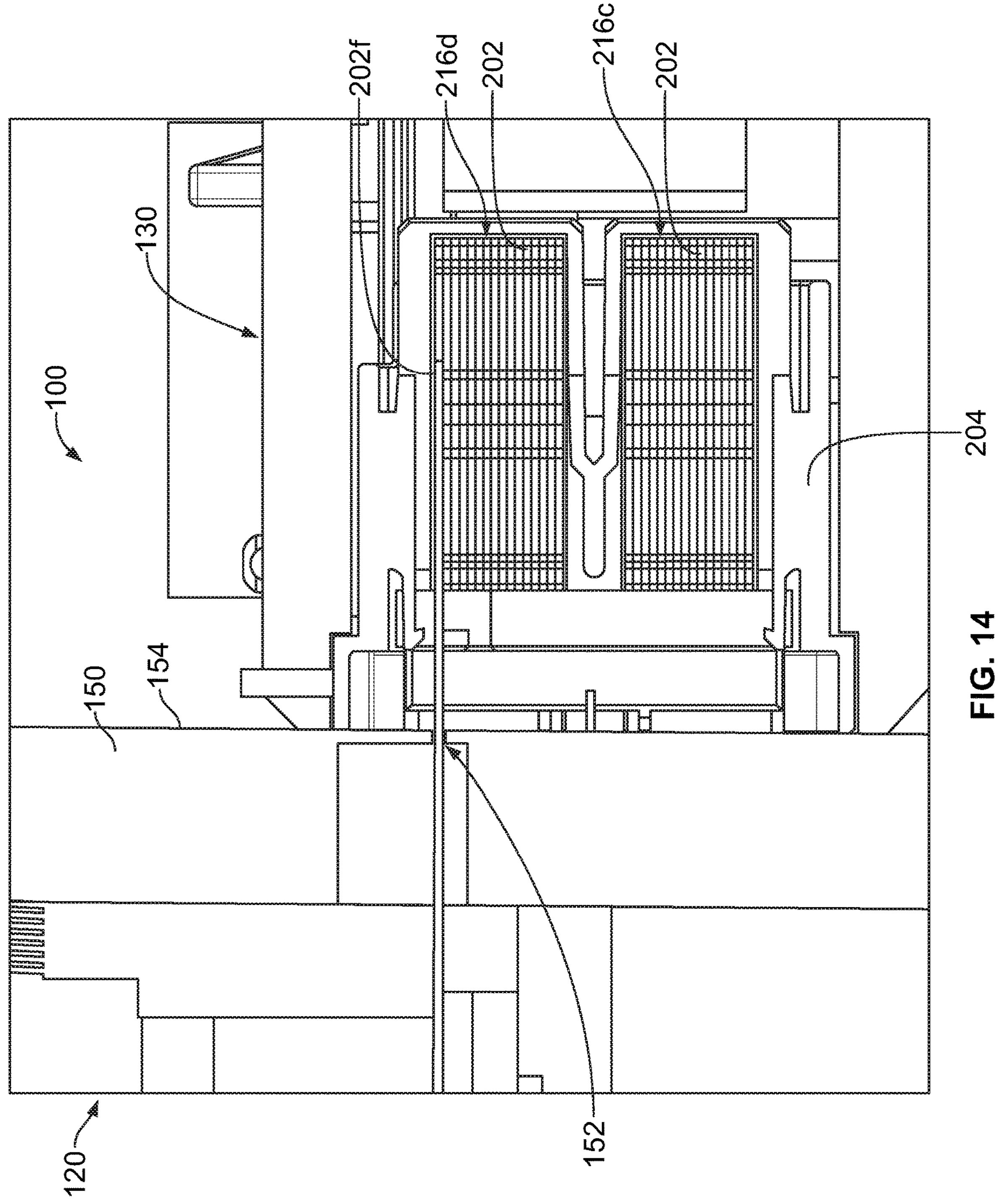
FIG. 14 is a cross-sectional view of a portion of the contact insertion machine showing a contact partially loaded into the housing of the power connector assembly during a contact loading process.

FIG. 14 is a cross-sectional view of a portion of the contact insertion machine 100 showing one of the contacts 202*f* being loaded into the housing 204 during the contact loading process. The power connector assembly holder 130 is shown in a sixth insertion position relative to the contact retention plate 150 wherein the fourth contact chamber 216*d* is aligned with the contact insertion port 152. The contact feeder 120 loads the corresponding contact 202*f* through the contact insertion port 152 of the contact retention plate 150 into the fourth contact chamber 216*d*. The contact insertion machine 100 forms the fourth contact stack 208*d* in the fourth contact chamber 216*d* by stacking the contacts 202. For example, the bottom contact 202 in the contact stack 208*d* is initially loaded into the contact chamber 216*d* and then the additional contacts 202 are successively stacked on top of each other to form the contact stack 208*d*.

In the sixth insertion position, the contact insertion port 152 of the contact retention plate 150 is aligned with a single contact position within the housing 204. The contact retention plate 150 blocks all other contacts 202 from removal from the housing 204. For example, other contacts 202 in the fourth contact chamber 216*d* are blocked by the front surface 154 of the contact retention plate 150 from removal from the housing 204. Additionally, the contacts 202 in the third contact chamber 216*c* (and first and second contact chambers 216*a*, 216*b* (shown in FIG. 3)) are blocked by the front surface 154 of the contact retention plate 150 from removal from the housing 204.

Figure 15:
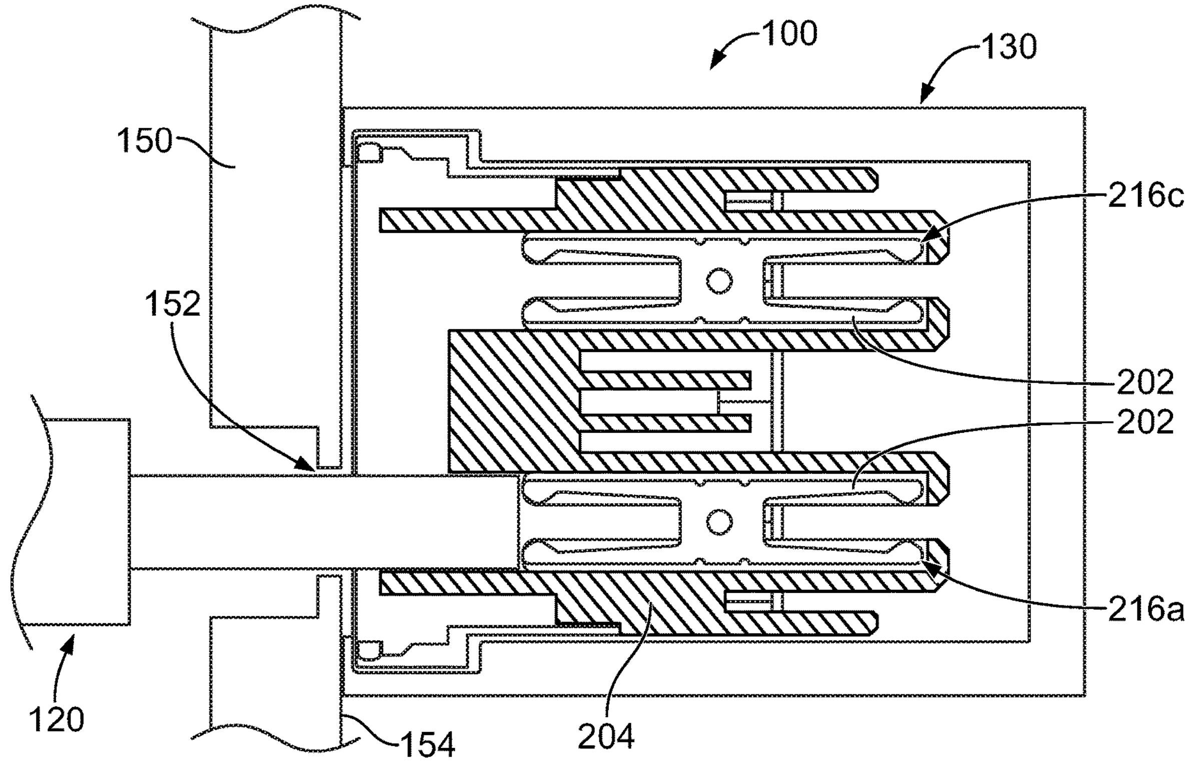
FIG. 15 is a cross-sectional view of a portion of the contact insertion machine showing a contact partially loaded into the housing during a contact loading process.

FIG. 15 is a cross-sectional view of a portion of the contact insertion machine 100 showing one of the contacts 202 being loaded into the housing 204 during the contact loading process. The power connector assembly holder 130 is shown in an insertion position relative to the contact retention plate 150 wherein the first contact chamber 216*a* is aligned with the contact insertion port 152. The contact feeder 120 loads the corresponding contact 202 through the contact insertion port 152 of the contact retention plate 150 into the first contact chamber 216*a*. The contact insertion port 152 of the contact retention plate 150 is aligned with a single contact position within the housing 204. The contact retention plate 150 blocks all other contacts 202 from removal from the housing 204. For example, other contacts 202 in the third contact chamber 216*c* are blocked by the front surface 154 of the contact retention plate 150 from removal from the housing 204.

Figure 16:
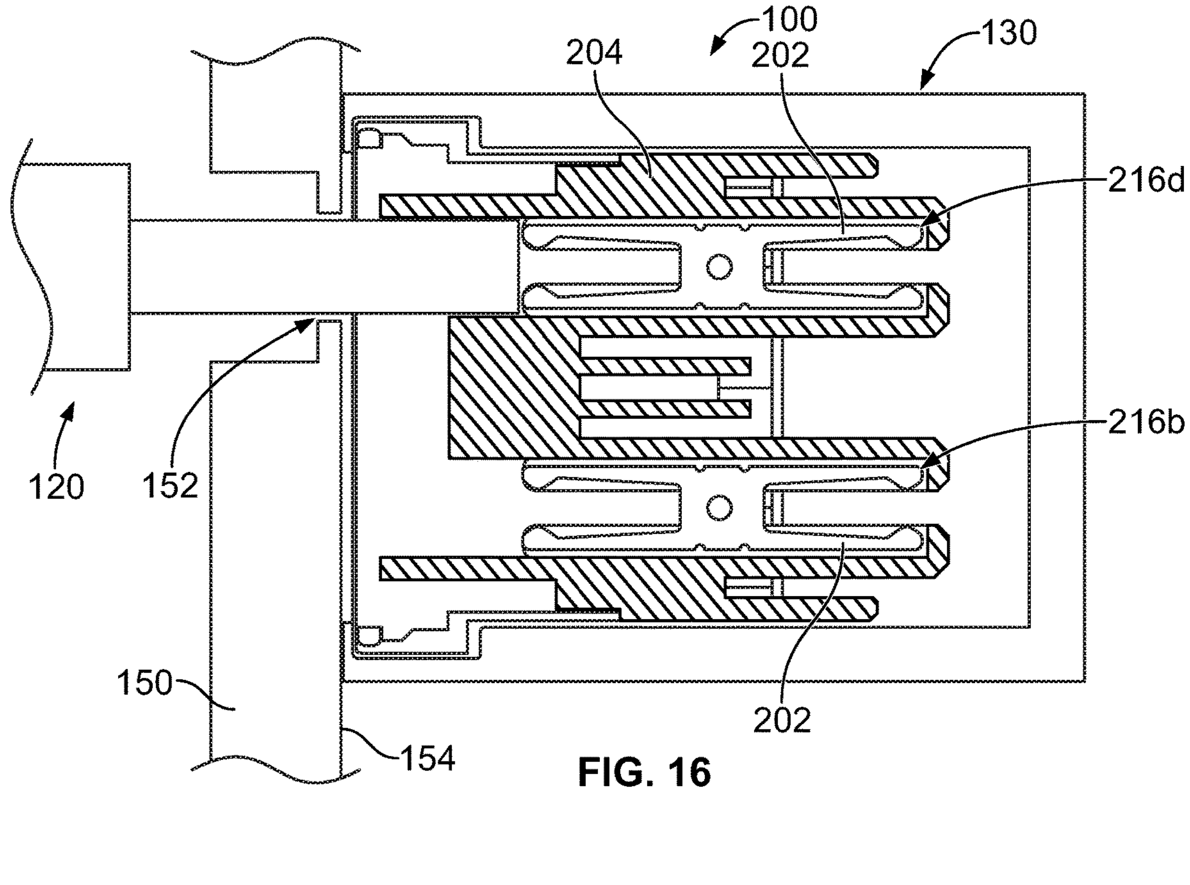
FIG. 16 is a cross-sectional view of a portion of the contact insertion machine showing a contact partially loaded into the housing during the contact loading process.

FIG. 16 is a cross-sectional view of a portion of the contact insertion machine 100 showing one of the contacts 202 being loaded into the housing 204 during the contact loading process. The power connector assembly holder 130 is shown in an insertion position relative to the contact retention plate 150 wherein the fourth contact chamber 216*d* is aligned with the contact insertion port 152. The contact feeder 120 loads the corresponding contact 202 through the contact insertion port 152 of the contact retention plate 150 into the fourth contact chamber 216*d*. The contact insertion port 152 of the contact retention plate 150 is aligned with a single contact position within the housing 204. The contact retention plate 150 blocks all other contacts 202 from removal from the housing 204. For example, other contacts 202 in the second contact chamber 216*b* are blocked by the front surface 154 of the contact retention plate 150 from removal from the housing 204.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A contact insertion machine comprising:

a contact feeder having a feed finger configured to feed contacts of a power connector assembly in a feed direction along a feed track during a contact loading process;

a power connector assembly holder configured to hold a housing of the power connector assembly, the power connector assembly movable relative to the feed track to position the housing to receive the contacts in a contact stack; and a contact retention plate located upstream of the power connector assembly holder, the contact retention plate having a contact insertion port therethrough, the contact insertion port being aligned with the feed track downstream of the feed track, wherein the power connector assembly holder is movable relative to the contact retention plate to position the housing to receive the contacts through the contact insertion port.

2. The contact insertion machine of claim 1, wherein the contact retention plate is a backstop to prevent the contacts from being removed from the housing during the contact loading process.

3. The contact insertion machine of claim 1, wherein the contact retention plate is fixed relative to the feed track.

4. The contact insertion machine of claim 1, wherein the power connector assembly holder holds the housing immediately forward of the contact retention plate.

5. The contact insertion machine of claim 1, wherein the contact retention plate includes a front surface and a rear surface, the rear surface facing the feed track, the front surface facing the power connector assembly holder.

6. The contact insertion machine of claim 1, wherein the power connector assembly holder is movable in a lateral locating direction perpendicular to the feed direction to position the housing to receive the contacts in different contact chambers of the housing.

7. The contact insertion machine of claim 1, wherein the power connector assembly holder is movable in a vertical locating direction perpendicular to the feed direction to position the housing to receive the contacts in the contact stack.

8. The contact insertion machine of claim 7, wherein the power connector assembly holder is movable in a lateral locating direction perpendicular to the feed direction and perpendicular to the vertical loading direction to position the housing to receive the contacts in different contact chambers of the housing.

9. The contact insertion machine of claim 1, wherein the contact insertion port includes a first side edge and a second side edge opposite the first side edge, the contact insertion port having a width between the first and second side edges being slightly wider than a width of the contacts.

10. The contact insertion machine of claim 9, wherein the contact insertion port includes an upper edge and a lower edge opposite the upper edge extending between the first and second side edges, the contact insertion port having a height between the upper edge and the lower edge being slightly taller than a height of the contacts.

11. The contact insertion machine of claim 1, wherein the power connector assembly holder moves the housing to a first insertion position to align a first contact chamber of the housing with the contact insertion port, the power connector assembly holder moving the housing to a second insertion position to align a second contact chamber of the housing with the contact insertion port, the power connector assembly holder moving the housing to a contact blocking position, the contact retention plate blocking the contacts in the second contact chamber from removal from the housing when the power connector assembly holder is in the first insertion position, the contact retention plate blocking the contacts in the first contact chamber from removal from the housing when the power connector assembly holder is in the second insertion position, the contact retention plate blocking the contacts in the first contact chamber and in the second contact chamber from removal from the housing when the power connector assembly holder is in the contact blocking position.

12. The contact insertion machine of claim 11, wherein the power connector assembly holder moves the housing to a third insertion position to align a third contact chamber of the housing with the contact insertion port, the power connector assembly holder moving the housing to a fourth insertion position to align a fourth contact chamber of the housing with the contact insertion port, the contact retention plate blocking the contacts in the first contact chamber, the second contact chamber and the fourth contact chamber from removal from the housing when the power connector assembly holder is in the third insertion position, the contact retention plate blocking the contacts in the first contact chamber, the second contact chamber and the third contact chamber from removal from the housing when the power connector assembly holder is in the fourth insertion position, the contact retention plate blocking the contacts in the third contact chamber and in the fourth contact chamber from removal from the housing when the power connector assembly holder is in the contact blocking position.

13. The contact insertion machine of claim 1, wherein the power connector assembly holder moves the housing to a first insertion position to align a first contact chamber of the housing with the contact insertion port for loading a first contact of the contacts into the first contact chamber, the power connector assembly holder moving the housing to a second insertion position to align the first contact chamber of the housing with the contact insertion port for loading a second contact of the contacts into the first contact chamber above the first contact, the power connector assembly holder moving the housing to a third insertion position to align the first contact chamber of the housing with the contact insertion port for loading a third contact of the contacts into the first contact chamber above the second contact.

14. The contact insertion machine of claim 1, wherein the power connector assembly holder transitions the housing from the contact retention plate by rotating the housing away from the contact retention plate in a removal direction such that gravity retains the contacts in the housing prior to coupling a rear cover to the housing.

* * * * *